Feb. 10, 1942.   A. ALFORD   2,272,997
LANDING BEACON SYSTEM
Filed Oct. 11, 1939   2 Sheets-Sheet 1

INVENTOR
ANDREW ALFORD
BY
ATTORNEY

Feb. 10, 1942. A. ALFORD 2,272,997
LANDING BEACON SYSTEM
Filed Oct. 11, 1939 2 Sheets—Sheet 2
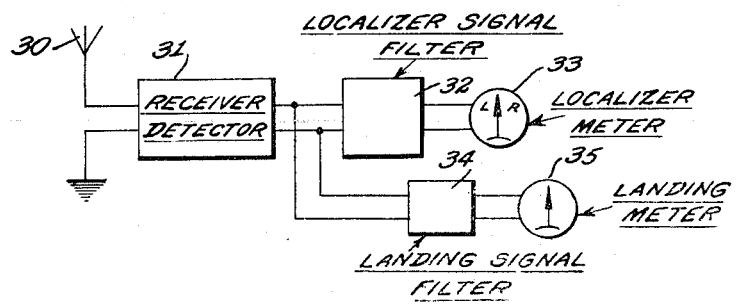
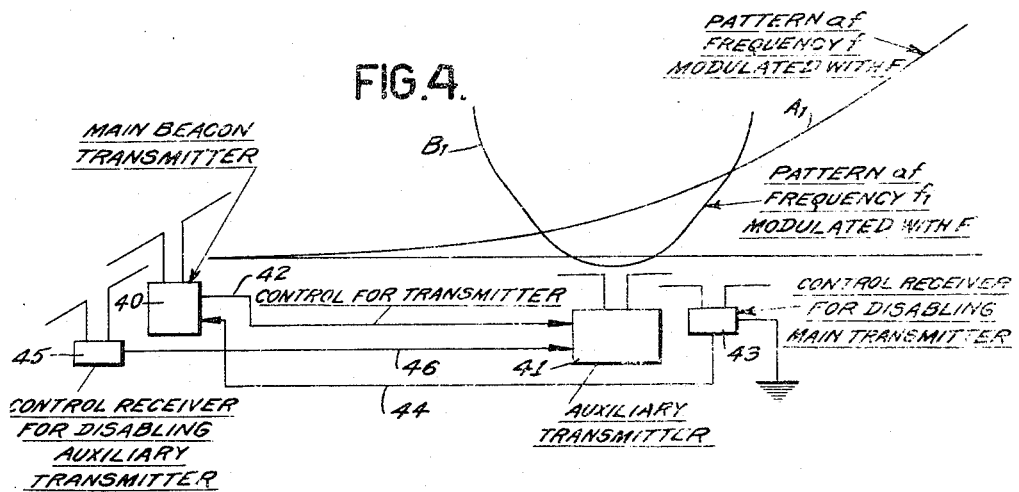
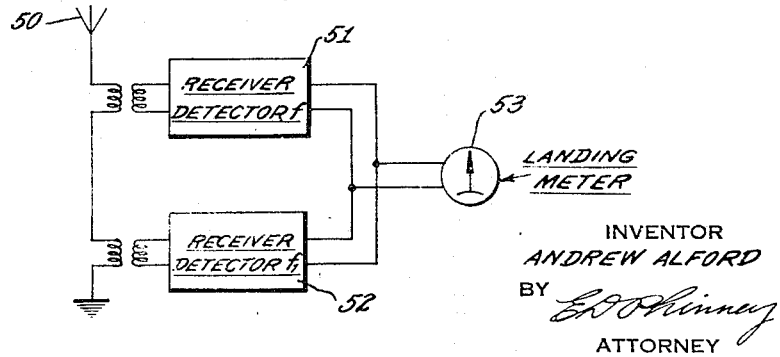
INVENTOR
ANDREW ALFORD
BY
ATTORNEY Patented Feb. 10, 1942

2,272,997

UNITED STATES PATENT OFFICE 2,272,997

LANDING BEACON SYSTEM

Andrew Alford, New York, N. Y., assignor to International Telephone Development Co., Inc., New York, N. Y., a corporation of Delaware Application October 11, 1939, Serial No. 298,904

9 Claims. (Cl. 250—11)

My invention relates to beacons for guiding airplanes to a landing, and more particularly to such glide path beacons designed to produce a substantially rectilinear landing path.

Beacon arrangements for guiding aircraft to a landing have been proposed wherein a special antenna radiating a beam having a curve of constant field intensity for guiding a craft to a landing runway were provided. In general the characteristic curve of constant field intensity used for guiding the craft to a landing is quite steep at the higher altitudes and is very flat near the point of landing, necessitating a dangerously high landing speed.

Furthermore, the airplane following one of these beacon curves must be quite near the landing surface for a considerable distance before landing, making it difficult to clear obstacles that may be in its path.

In accordance with my invention these difficulties are obviated by providing a beacon transmitter producing a characteristic curve similar to the usual landing beam system, and providing an auxiliary transmitter, transmitting waves modulated with the same type of signal as that provided in the main transmitter and so located that an additive effect of these signals from the main transmitter and the auxiliary transmitter will define a substantially rectilinear landing trajectory or path.

In accordance with one feature of my invention, the auxiliary transmitter may be energized alternately with the main transmitter so that no vectorial addition of the waves will take place at the receiving point, the receiver being provided with means for indicating the average amplitude of these two signals to define a substantially constant landing curve.

According to another feature of my invention, the main transmitter may be made in the form of a localizer beacon, so that the airplane may be guided to a landing in the correct direction by the single beacon arrangement.

According to another feature of my invention, the landing signal may be transmitted from a main transmitter and an auxiliary transmitter energized at different radio frequencies, each of these transmitted waves being modulated with the same signal, whereby an addition of the signal energies may be made at the receiver without any vectorial addition thereof. In this latter arrangement entirely separate radio frequency oscillators may be used, or an oscillator may be provided modulated to produce two side bands, the separate side bands being utilized as the two carrier frequencies.

According to another feature of my invention, means may be provided responsive to said cessation of signals from either of the transmitters for disabling the other transmitter to avoid production of false signal indications.

Other features and objects of my invention will be clear from a description of preferred embodiments of my invention made in connection with the accompanying drawings, in which:

Fig. 3 shows a diagram of a receiver arrangement suitable for use with the beacon of Fig. 2;

Fig. 4 shows a modified type of landing beacon utilizing a main transmitter and auxiliary transmitter operating under different frequencies, and Fig. 5 illustrates a receiver arrangement suitable for use with the beacon illustrated in Fig. 4.

Figure 1:
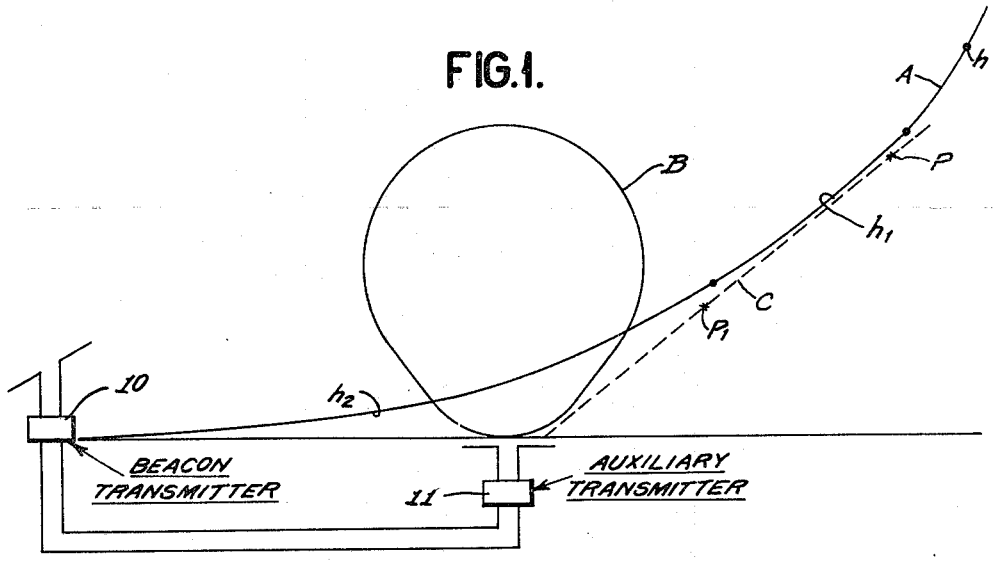
Fig. 1 shows diagrammatically an arrangement for explaining the principles of my invention.

In Fig. 1 10 represents a beacon transmitter producing the radiation pattern having a constant intensity curve A. As can be seen this curve possesses the usual characteristics for certain known forms of landing beacons. A portion of this curve, designated by $h$ is too steep for landing purposes, while that part designated $h_2$ near the surface of the earth is too gradual. An intermediate portion $h_1$ of the curve possesses substantially the proper correct angle for landing. It should be understood that Fig. 1 is entirely diagrammatic and is not intended to indicate the actual correct angles of landing aircraft.

In order to rectify the errors of this curve I provide an auxiliary transmitter 11, preferably located at a point spaced from the beacon transmitter in the directions from which the aircraft approaches landing, and mounted at a point below the landing surface. This auxiliary radiator produces a radiated pattern B, and is positioned preferably at the point in the runway approximately at the desired point of landing. Transmitters 10 and 11 are alternately energized or are otherwise distinguishably characterized from each other so that the resultant radiation pattern, A, B, will not add vectorially according to the phase relation of the carrier frequency energy to produce a distorted pattern having multiple lobes and nodes. Accordingly, on the receiver of the aircraft an additive effect of the signals takes place. By selection and proportioning the radiation patterns, for example, by adjustment of the antennae and control of the amplitude of energy supplied thereto a substantially rectilinear effective constant signal intensity path C is obtained, which the aircraft follows to a landing point.

At point P on the landing curve, the signal from 10 will be strong and the signal from 11 will be very weak, so that the pattern at P will be substantially the same as though the radiator 11 were not present. As the airplane follows down curve A and reaches point $P_1$, the signal from 11 becomes greater and consequently tends to bring the landing line C below the curve A at this point.

Accordingly, as the plane continues downwardly during landing, the addition of the curves A and B may be made to produce a substantially rectilinear path, as indicated in the drawings.

The beacon transmitter 10 is preferably made in the form of a localizer beacon, so as to produce a lateral guiding line for the airplane during the landing operation. Beacon transmitters 10 and 11 may operate on the same wavelength and be alternately keyed, or may be separately energized at different radio frequencies and modulated with the same signal to produce a resultant effectively constant amplitude signal by the additive effect at the receiving points along the desired straight line landing path.

Figure 2:
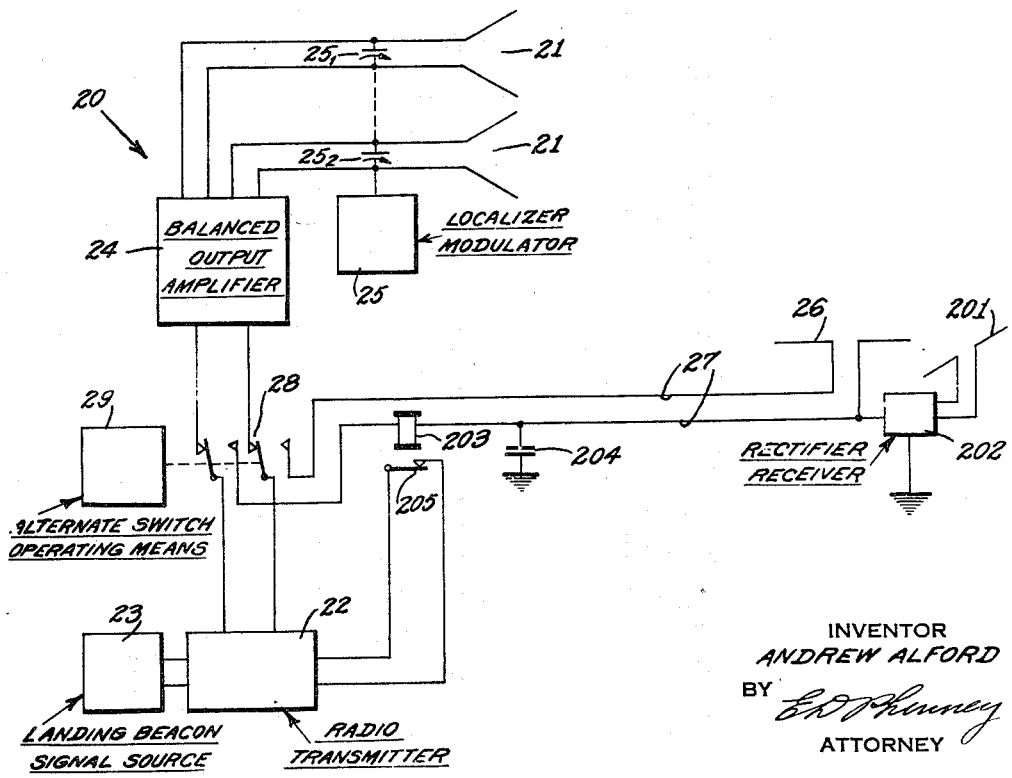
Fig. 2 illustrates a preferred embodiment of my invention utilizing alternate energization of the beacon antenna and auxiliary radiator.

A preferred radio beacon arrangement in accordance with my invention is disclosed in Fig. 2. In this system the main beacon transmitter 20 comprises a pair of radiators 21, energized from a radio frequency source 22 modulated with landing beacon signals from source 23 and supplied over balanced output amplifier 24 to radiators 21. The signal modulated wave radiated from antennae 21 are given different characteristic amplitude modulation by means of localizer modulator 25 by any of known means, such as variable condensers $25_1$, $25_2$, to produce distinctive signal characteristics on each of the radiated patterns from the separate antennae.

Although I have illustrated the localizer beacon as comprising separate directive antennae 21, it should be distinctly understood that other forms of guiding beacons producing an indication for directing the aircraft in the line of landing may be provided.

It should also be noted that the energy radiated from both antennae 21 is modulated with the landing beacon signals so that the entire output pattern is characterized by these landing beacon signals. The antennae are preferably arranged to produce a landing curve somewhat in the order of the curve A, shown in Fig. 1. This may be achieved by properly placing the antennae with respect to the earth or other reflecting surface.

At a point spaced from antennae 21, I provide an auxiliary radiator 26 preferably mounted beneath the surface of the earth at approximately the point of contact for the landing aircraft. This auxiliary radiator is connected over line 27 to the main transmitter. Switching means 28 is provided operated by means 29 to alternately connect radio frequency source 22 to the main beacon antennae 21, and to the auxiliary transmitting antenna 26. Antenna 26 is provided to radiate sufficient energy so that the signal energy transmitted therefrom added to that transmitted from the localizer beacon antennae 21, will produce a substantially rectilinear landing curve, as explained in connection with Fig. 1.

In event that auxiliary radiator 26 should fail to operate for some reason, an aircraft coming into a landing would follow the false curve formed by beacon antennae 21 and therefore might crash into the transmitter station itself, or into other obstacles near the field. In order to overcome this danger I provide auxiliary equipment in the form of a small receiving antenna 201, positioned to receive radiated energy from antenna 26. This energy is rectified at 202 and impressed upon one of the conductors of line 27. This rectified energy traverses the winding of a relay 203 through a circuit established within the radio transmitter when the switch is positioned to energize antenna 26. A condenser 204 is provided to give the desired time constant to the relay 203 so that it will not become deenergized while the switch 28 is normally operating to connect and disconnect antennae 21 and 26 alternately to the transmitter. Relay 203 in its energized condition maintains a contact 205 closed so as to complete the energizing circuit for transmitter 22. Upon failure of antenna 26 to radiate relay 203 drops opening the circuit of radio transmitter 22 and cutting the entire beacon off the air. Should the localizer beacon fail the pilot will be apprised of this fact due to the failure to receive the regular guiding signal and so will be warned not to attempt a landing on the beam.

In event that the main transmitter is not simultaneously utilized as a localizer, a similar disabling means may be provided controlled from the main transmitter for disabling the auxiliary transmitter in event of a failure of the main transmitter.

In accordance with the system described above, the glide path indication is furnished when an airplane is on course and the localizer is working. When the localizer is out of order there will be no glide path indication at the higher altitudes since auxiliary radiator 26 is not of sufficient strength to produce such a path at a great distance. The arrangement may be added to previously installed localizer systems, the only additional equipment necessary being the added modulator for impressing glide path signals on the localizer and the added small auxiliary radiator, no added transmitter being necessary to provide a separate glide path indication.

A receiver suitable for use with the beacon disclosed in Fig. 2 is shown in Fig. 3. The localizer and glide path signals are both received on antenna 30 and amplified and detected in receiver 31. A filter 32 is provided to separate out the localizer signal and apply these signals to a meter 33 for indicating the correct landing direction. A second filter 34 is provided to separate out the landing signals and to apply them to a landing meter 35. Meter 35 may be of any known type, it being merely necessary that the meter possess sufficient inertia so that signals received from the alternately energized beacon radiators will produce a resultant indication dependent upon their combined strengths.

In Fig. 4 I have illustrated another embodiment of my invention whereby suitable landing line patterns may be produced. In this figure the main beacon 40, which may be designed in the form of a localizer beacon is energized with landing signal modulated waves of a particular frequency. This beacon 40 produces a curve $A_1$ similar to curve A of Fig. 1. An auxiliary transmitter 41 is provided, this transmitter being energized with a different radio frequency modulated with the same landing beacon signals as transmitter 40. This transmitter 41 produces the auxiliary pattern B1, similar to curve B of Fig. 1. Preferably a control from transmitter 40 is provided, as indicated by the line 42. This control may, for example, be such as to assure that the second transmitter is properly modulated or it may be a common line wherein the energy at the main transmitter 40 is modulated with a particular frequency, one side band being selected and radiated from transmitter 40 while the other side band is transmitted over line 42 to transmitter 41 for radiation from that transmitter. The characterization of the radiations from the two beacons with different radio frequencies is necessary because two antennae continuously operating on identical frequencies would produce a vectorial addition of the radiated energy due to the phase relationship of the combining carrier energy. Consequently the system would not produce the desired non-vectorial additive effect for obtaining the straight line landing path but would merely produce a different resultant curve having an irregular pattern.

If desired, means may be provided for disabling each of the transmitters in response to a failure of the other to operate. Such means are shown at 43 operating over line 44 to disable the main transmitter in response to failure of the auxiliary transmitter 41 to operate, and at 45 for receiving energy from the main beacon transmitter 40 and operating over line 46 to disable the auxiliary transmitter in response to failure of the beacon transmitter, are also provided.

A receiver suitable for operation with a beacon system such as disclosed in Fig. 4, is illustrated in Fig. 5. In this arrangement the antenna 50 is broadly tuned to the carrier waves of frequency $f$ transmitted from main transmitter 40 and waves of frequency $f_1$ transmitted from auxiliary radiator 41. These signals may be separated in the tuned receivers 51 and 52, respectively, detected and applied to landing meter 53 over a common output. If the frequencies $f$, $f_1$ are closely related a common amplifier may be provided for amplifying the signals before filtering and detecting them for application to the landing meter.

Furthermore, the separate localizer filter and meter arrangement similar to that shown in Fig. 3 may be provided to operate from the output of the receiver 51 if desired.

While I have described my invention in connection with the specific preferred embodiments illustrated in the drawings, it will be clear to those skilled in the art that other arrangements of the apparatus may be readily produced within the scope of my invention. The auxiliary transmitter may, for example, be located in any desired place, it being merely necessary that the two transmitters be so associated that the additive effect of the signals received on an aircraft will define a substantially rectilinear landing line. This additive effect may be achieved by providing the separate signal modulated radiation patterns in such a form that they may be separately applied to the receiving meter to produce the resultant effective constant intensity landing indication. Furthermore, any desired type of transmitting antenna may be utilized and any desired type of receiver arrangement suitable for the purpose may be used in place of the arrangement illustrated in the drawings.

Various modifications of the invention other than the specific embodiment disclosed herein come within the scope of the invention as defined in the appended claims.

What I claim is:

1. A radio beacon system for guiding aircraft to a landing comprising a first transmitter for producing a radiation signal pattern having a given curve of constant field intensity in a vertical plane extending over the landing surface, a second transmitter for transmitting a second radiation pattern intersecting said first named pattern, said second transmitter being located substantially in line with said first transmitter and spaced therefrom in the direction of approach of said aircraft to landing and means for supplying the same signal to both said transmitters, said first and second transmitters having different vertical distribution patterns and being so arranged that the effective sum of their related radiation patterns produce in space a signal pattern forming a substantially straight constant intensity line landing path.

2. A radio beacon system according to claim 1, wherein said second transmitter comprises a radiator mounted beneath the landing surface substantially at the point of landing.

3. A radio beacon system according to claim 1, further comprising means for alternately rendering said first and second transmitters operative.

4. A radio beacon system according to claim 1, wherein said first transmitter comprises means for producing signals for laterally guiding an aircraft, further comprising means responsive to cessation of signals radiated from said second transmitter for disabling said first transmitter.

5. A radio beacon system comprising a beacon transmitter arrangement comprising a first transmitter for producing a radiation signal pattern having a given curve of constant field intensity in a vertical plane, and a second beacon transmitter spaced from said first transmitter in the direction of approach of an aircraft making a landing, for transmitting a second radiation signal pattern having the same signal frequency as said first radiation pattern intersecting said first named pattern and having a different constant intensity curve in said plane, and a receiver for receiving energy from both said radiation signal patterns, comprising means responsive to said received signals for producing an indication of the additive effect of the signals on said two radiation signal patterns 6. A radio beacon system according to claim 5, further comprising means for alternately rendering said first and second transmitters operative.

7. A radio beacon system according to claim 5, wherein said first transmitter comprises means for producing signals for laterally guiding an aircraft, further comprising means responsive to cessation of signals radiated from said second transmitter for disabling said first transmitter.

8. A radio beacon system according to claim 5, further comprising means for supplying signal modulated waves of one carrier frequency to said first transmitter, and means for supplying signal modulated waves of a different frequency to said second transmitter.

9. A radio beacon system according to claim 5, further comprising means for disabling said first transmitter in response to failure of said sceond transmitter.

ANDREW ALFORD.